United States Patent
Johnson

(10) Patent No.: US 7,506,448 B1
(45) Date of Patent: Mar. 24, 2009

(54) LAYOUT CLIP AND METHOD OF USE

(76) Inventor: Dale Johnson, 8561 N. Cloverleaf Rd., TRLR 58, Hauser, ID (US) 83854

( * ) Notice: Subject to any disclaimer, the term of this patent is extended or adjusted under 35 U.S.C. 154(b) by 0 days.

(21) Appl. No.: 11/851,491

(22) Filed: Sep. 7, 2007

(51) Int. Cl.
*E03B 1/00* (2006.01)
*G01C 15/02* (2006.01)

(52) U.S. Cl. .................. 33/1 LE; 33/1 H; 52/741.1

(58) Field of Classification Search .............. 33/1 F, 33/1 G, 1 H, 1 LE, 518, 521, 526, 529, 624, 33/645, 700, 701, 756, 759, DIG. 16; 24/3.1, 24/3.12, 545, 546, 557, 570, 571, DIG. 29; 52/741.1, 749.1, DIG. 1
See application file for complete search history.

(56) References Cited

U.S. PATENT DOCUMENTS

| | | | | |
|---|---|---|---|---|
| 944,462 | A | * | 12/1909 | Osborne, Jr. .................. 33/521 |
| 1,956,879 | A | * | 5/1934 | Sharp ........................ 52/741.1 |
| 2,142,776 | A | * | 1/1939 | Behnke ...................... 24/129 R |
| 3,411,978 | A | | 11/1968 | Frohbach |
| 3,514,863 | A | * | 6/1970 | Moll .......................... 33/764 |
| 3,656,213 | A | * | 4/1972 | McNeely ..................... 24/564 |
| 4,149,320 | A | | 4/1979 | Troyer et al. |
| 4,152,836 | A | | 5/1979 | Rodrique |
| 4,679,325 | A | | 7/1987 | Sweatman |
| 4,924,579 | A | | 5/1990 | Berendsen |
| 5,003,735 | A | * | 4/1991 | Bates ......................... 52/105 |
| 5,125,162 | A | | 6/1992 | Prebeck |
| 5,158,428 | A | | 10/1992 | Gessner et al. |
| 5,280,921 | A | * | 1/1994 | Milburn ....................... 33/759 |
| 5,950,321 | A | | 9/1999 | Pena et al. |
| 6,036,133 | A | | 3/2000 | Milligan |
| 6,826,845 | B2 | | 12/2004 | Pritchard |
| 7,197,832 | B2 | * | 4/2007 | Bond .......................... 33/414 |
| 2002/0026723 | A1 | | 3/2002 | Savalla |
| 2003/0046846 | A1 | * | 3/2003 | Goodman ..................... 40/658 |
| 2004/0006935 | A1 | | 1/2004 | Moorhead |
| 2005/0109260 | A1 | * | 5/2005 | Wydner ...................... 116/209 |
| 2007/0068114 | A1 | * | 3/2007 | Caretto ....................... 52/741.1 |
| 2007/0089312 | A1 | | 4/2007 | Wade |

FOREIGN PATENT DOCUMENTS

| | | | |
|---|---|---|---|
| DE | 4238523 A1 | * | 5/1994 |
| GB | 2431721 A | * | 5/2007 |
| JP | 08089315 | | 4/1996 |
| JP | 11324330 | | 11/1999 |
| JP | 2002202131 | | 7/2002 |
| JP | 2002276161 | | 9/2002 |
| JP | 2003074523 | | 3/2003 |
| JP | 2005120747 | | 5/2005 |

* cited by examiner

*Primary Examiner*—R. A. Smith
(74) *Attorney, Agent, or Firm*—Patwrite LLC; Mark David Torche

(57) ABSTRACT

A layout clip and method comprises a clip body having a channel formed therein which frictionally engages a string that is secured to a layout member that is placed to define a future structure. The layout clip has a gripping portion and is marked to indicate a structure layout position such as a wall etc. The clip has a layout mark on at least one surface. The layout clips are color coded to represent different service items such as plumbing lines or electrical runs. One embodiment includes an elongated gripping portion to aid in placing and removing the clip. A line clip method comprises locating and securing a string that corresponds to a structure such as a wall, pole or fence etc.; then securing a clip along the string to locate where a fixture or other component will be installed. The clips are removable and reusable.

3 Claims, 4 Drawing Sheets

LAYOUT CLIP AND METHOD OF USE

BACKGROUND OF THE INVENTION

One of the things that set humans apart from other life forms on earth is our seemingly endless drive to build and create things. From the early Egyptians who mastered pyramid building; the Romans who built structures such as the aqueducts that are still delivering water after two millennia, to modern builders with their sophisticated building materials, methods and machinery; all these builders had something in common; they had to layout before completing the structures.

Over time, many solutions have been proposed to help the builder layout the structures. Some solutions involved having the layout system being integrated into the structure thus not allowing reuse. Other systems require sophisticated equipment thus increasing the cost and complexity of the build. There is a need for a layout system that is easy to use, economical and reusable.

SUMMARY OF THE INVENTION

A layout clip and method comprises a clip body having a channel formed therein which frictionally engages a string that is secured to a layout member that is placed to define a future structure. The layout clip has a gripping portion and is marked to indicate a structure layout position such as a wall etc. The clip has a layout mark on at least one surface. The layout clips are color coded to represent different service items such as plumbing lines or electrical runs. One embodiment includes an elongated gripping portion to aid in placing and removing the clip. A line clip method comprises locating and securing a string that corresponds to a structure such as a wall, pole or fence etc.; then securing a clip along the string to locate where a fixture or other component will be installed. The clips are removable and reusable.

Other features and advantages of the instant invention will become apparent from the following description of the invention which refers to the accompanying drawings.

DETAILED DESCRIPTION OF THE INVENTION

Figure 1:
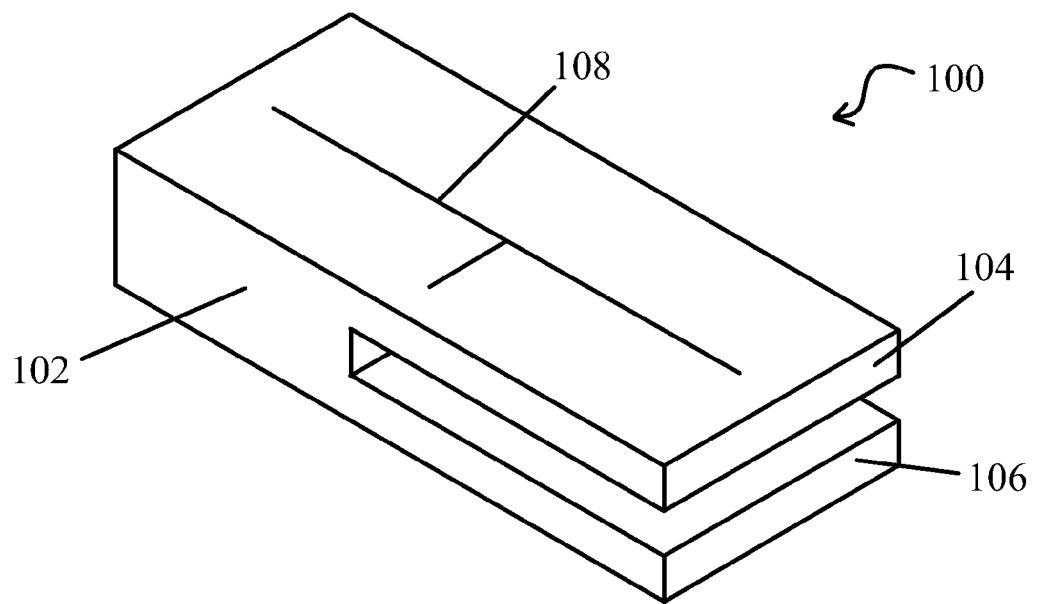
FIG. 1 is a perspective view of a line clip according to an embodiment of the present invention.

In the following detailed description of the invention, reference is made to the drawings in which reference numerals refer to like elements, and which are intended to show by way of illustration specific embodiments in which the invention may be practiced. It is understood that other embodiments may be utilized and that structural changes may be made without departing from the scope and spirit of the invention.

Referring to FIG. 1, a layout clip 100 is shown having a clip body 102 made of a resilient material such as plastic, carbon composite or other suitable material. Clip body 102 has a clip arm 104 and an opposite clip arm 106 with a gripping space defined between them that fits over a string frictionally engaging the string to hold layout clip 100 in place to mark the location of the component to be installed. A layout mark 108 on at least one surface of layout clip 100 is provided to mark the orientation of a future structure such as a wall and indicates position. Layout mark 108 generally consists of a long line with an orthogonally centered shorter line to indicate which side the wall is facing. Of course other layout marks may be used to meet specific applications.

Figure 2:
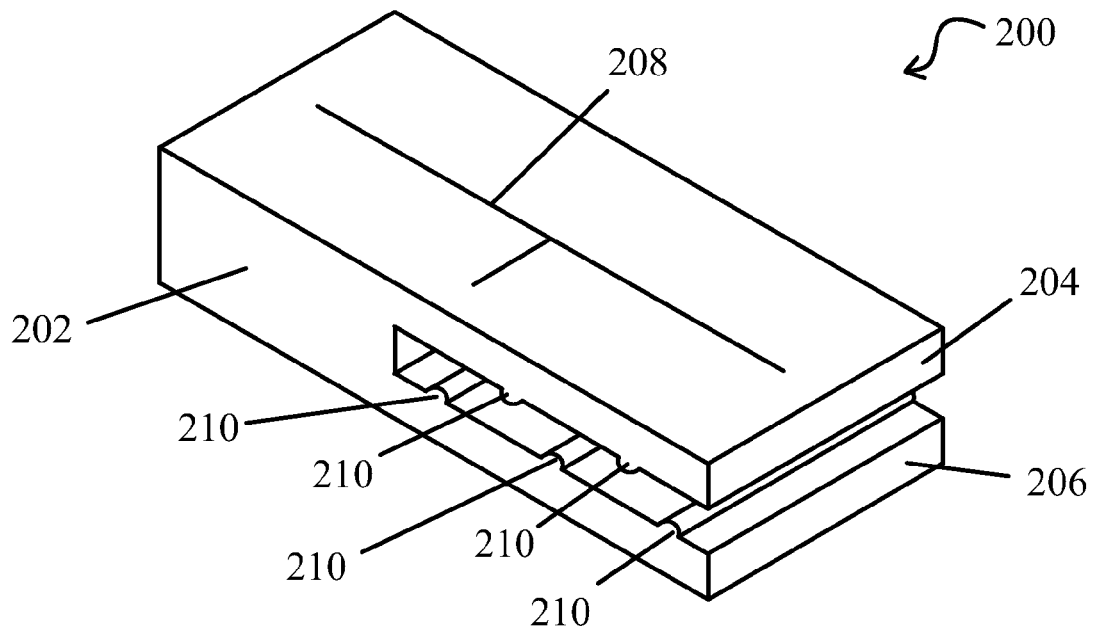
FIG. 2 is a perspective drawing of a line clip according to an embodiment of the present invention.

Now referring to FIG. 2, a layout clip 200 has clip body 202 with clip arms 204 and 206 defining a string gripping space therein. At least one layout mark 208 appears on a surface of layout clip 200. A plurality of frictional ridges 210 are disposed on facing inner side of clip arms 204 and 206 respectively to provide enhanced engagement with a string.

Figure 3:
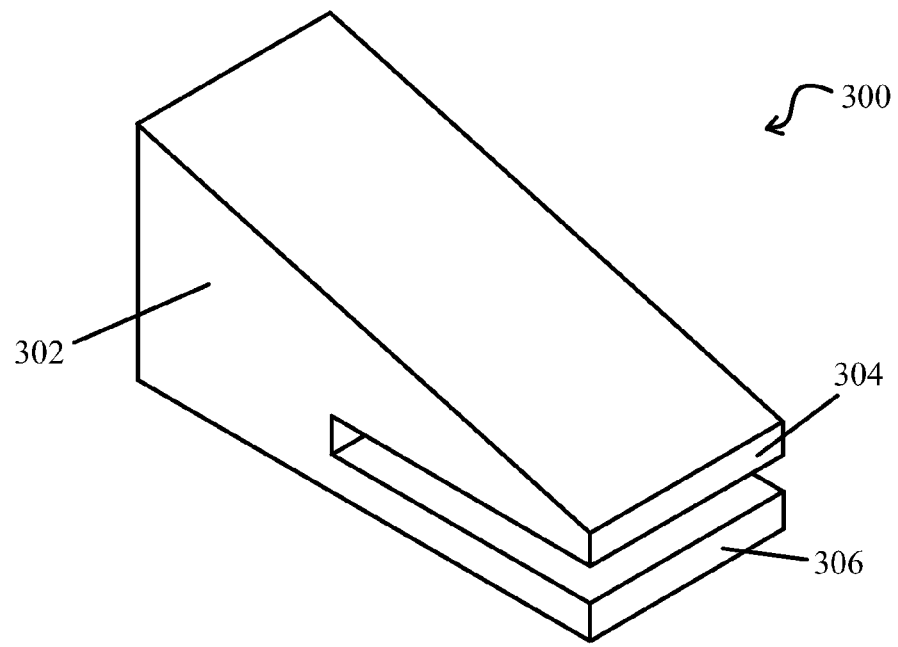
FIG. 3 is a perspective drawing of a line clip according to an embodiment of the present invention.

FIG. 3 illustrates an embodiment of a layout clip 300 having a generally wedge shaped clip body 302 and clip arms 304 and 306 defining a string gripping space disposed therein.

Figure 4:
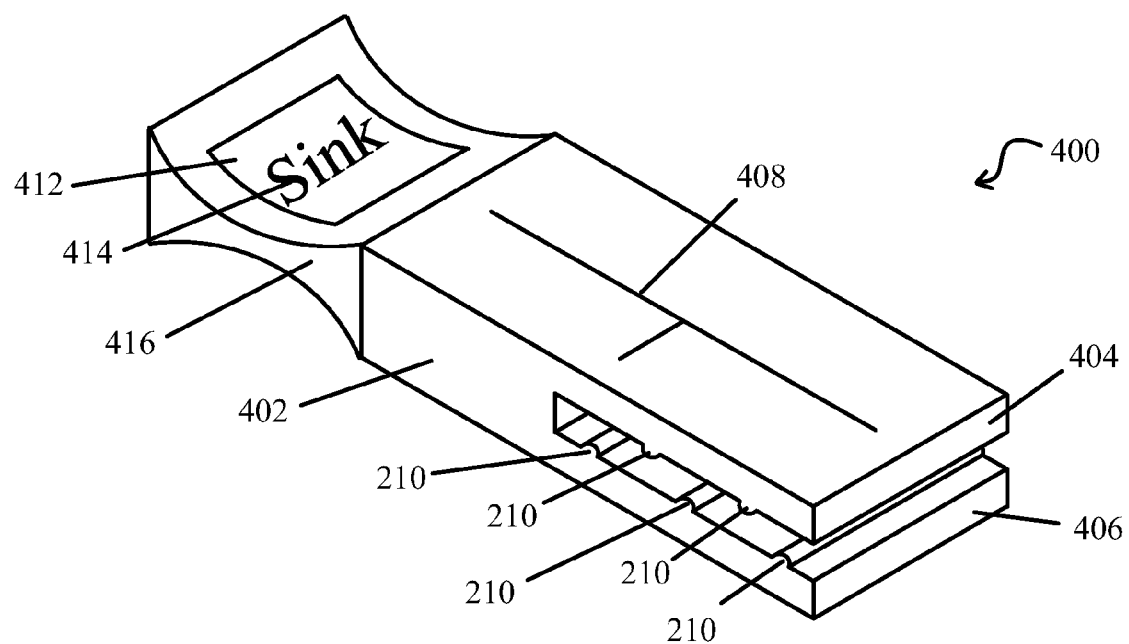
FIG. 4 is a perspective drawing of an embodiment according to an embodiment of the present invention.

Now referring to FIG. 4, a layout clip 400 is shown have a clip body 402 and clip arms 404 and 406 defining a string gripping space therein. In the embodiment shown, a plurality of frictional ridges 210 are provided to enhance the gripping abilities of layout clip 400. At least one layout mark 408 appears on a surface of layout clip 400. A grip portion 416 is distally located on an end opposite clip arms 404 and 406. The purpose of grip portion 416 is to allow a user to easily engage and disengage layout clip 400. Grip portion 416 has a label portion 412 used to provide a visual cue to the user as to the kind of service being represented by layout clip 400. A label 414 may be applied in label portion 412. A plurality of standard service labels may be provided with layout clips 400 or labels 414 may be permanently imprinted with a variety of labels commonly used in construction or other specific use.

Figure 5:
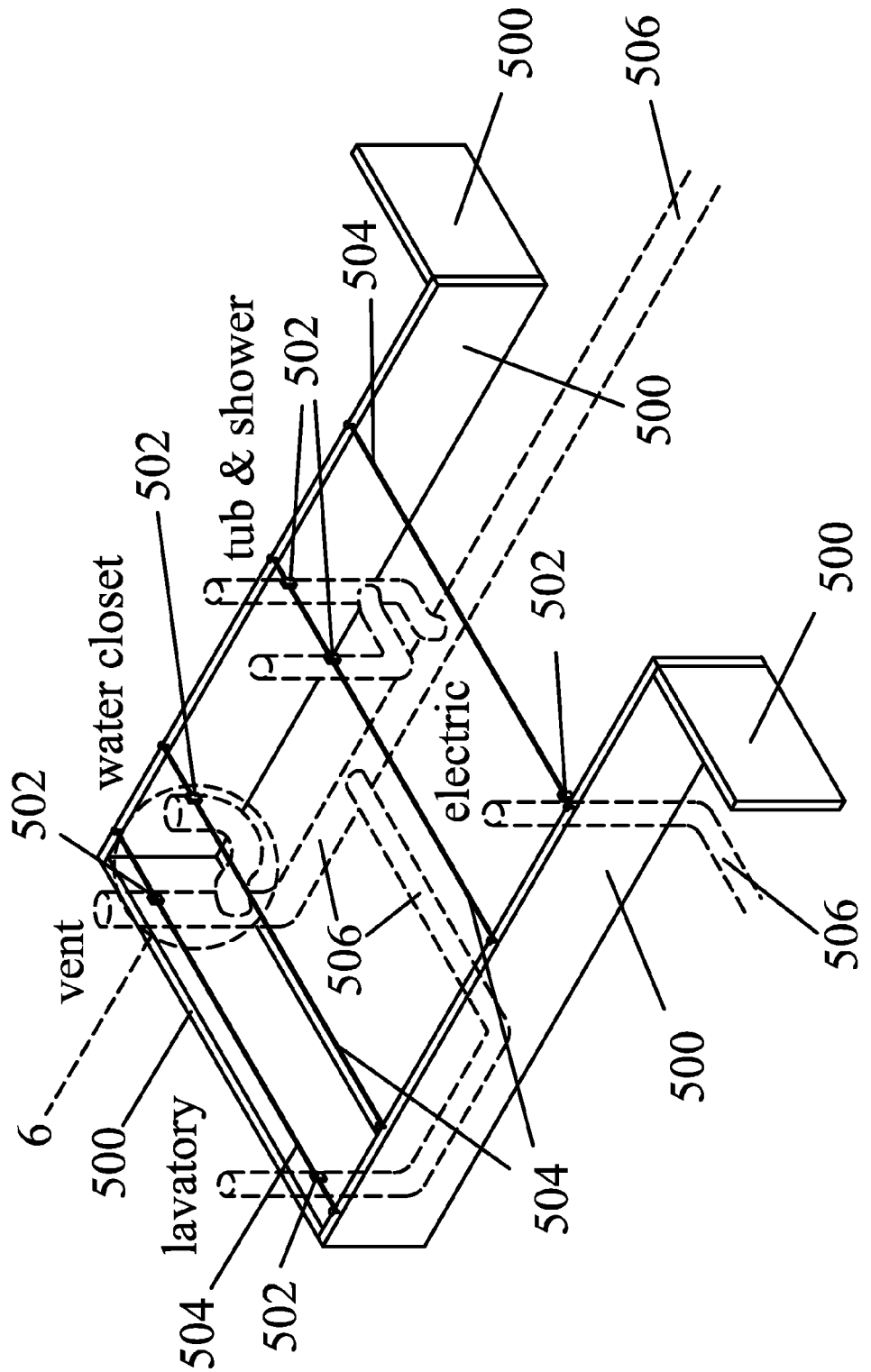
FIG. 5 is a perspective drawing of a job site laid out using line clips according to an embodiment of the present invention.
Figure 6:
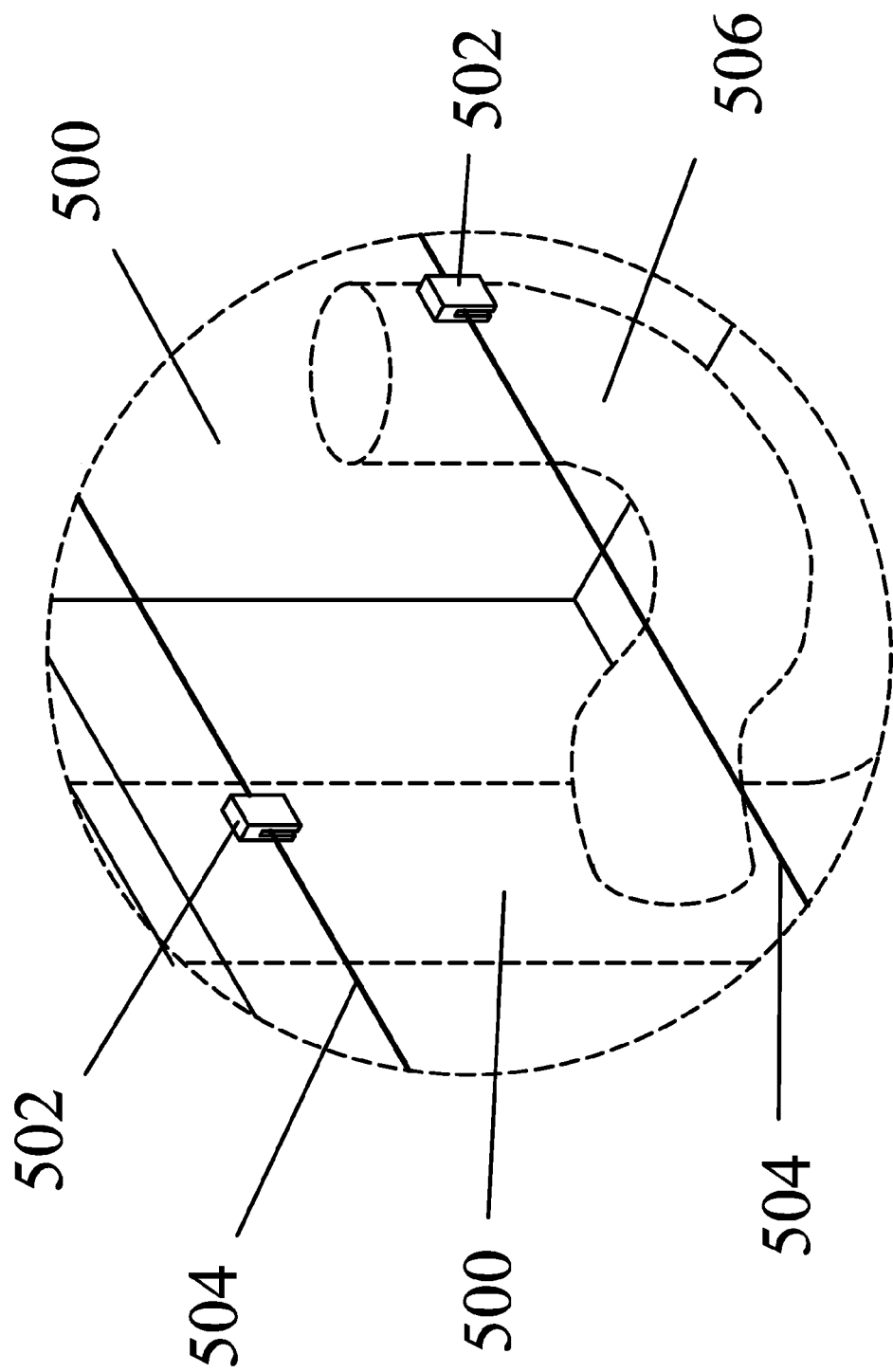
FIG. 6 is a detailed view of the portion shown in FIG. 5.

Referring to FIGS. 5 and 6, a jobsite is prepared by laying down layout members 500 in a position corresponding to the future location of a structure. Next layout string 504 is attached to layout members 500 with nails, screws or other method suitable to place layout string 504 under tension. Next, layout clips 502 are placed on layout string 504 at a service location 506 where a plumbing fixture or electrical run will be placed. The service is installed and then layout clips 502 may be removed and reused. Of course the example shown is specific to construction, but it is clear from the disclosure that the layout clips can be used to mark anything that can be laid out by using a string such as when laying out a fences, poles or foundations etc.

Although the instant invention has been described in relation to particular embodiments thereof, many other variations and modifications and other uses will become apparent to those skilled in the art.

What is claimed is:

1. A method for using layout clips to mark a jobsite comprising the steps of:
    locating layout members in a selected configuration corresponding to a future structure;
    securing an end of a string to a section of said layout member;
    securing another end of said string whereby said string is under tension and stretched taunt; and
    applying a layout clip along said string corresponding to a service location.

2. The method for using layout clips to mark a jobsite further comprising the step of selecting a color coded layout clip that corresponds to a selected component.

3. The method for using layout clips to mark a jobsite further comprising the step of aligning a layout mark disposed on at least one surface of said layout clip with the location of a to be installed component.

* * * * *